Oct. 8, 1935.          F. M. BOYER          2,016,740
                       FILTERING DEVICE
                     Filed March 26, 1935
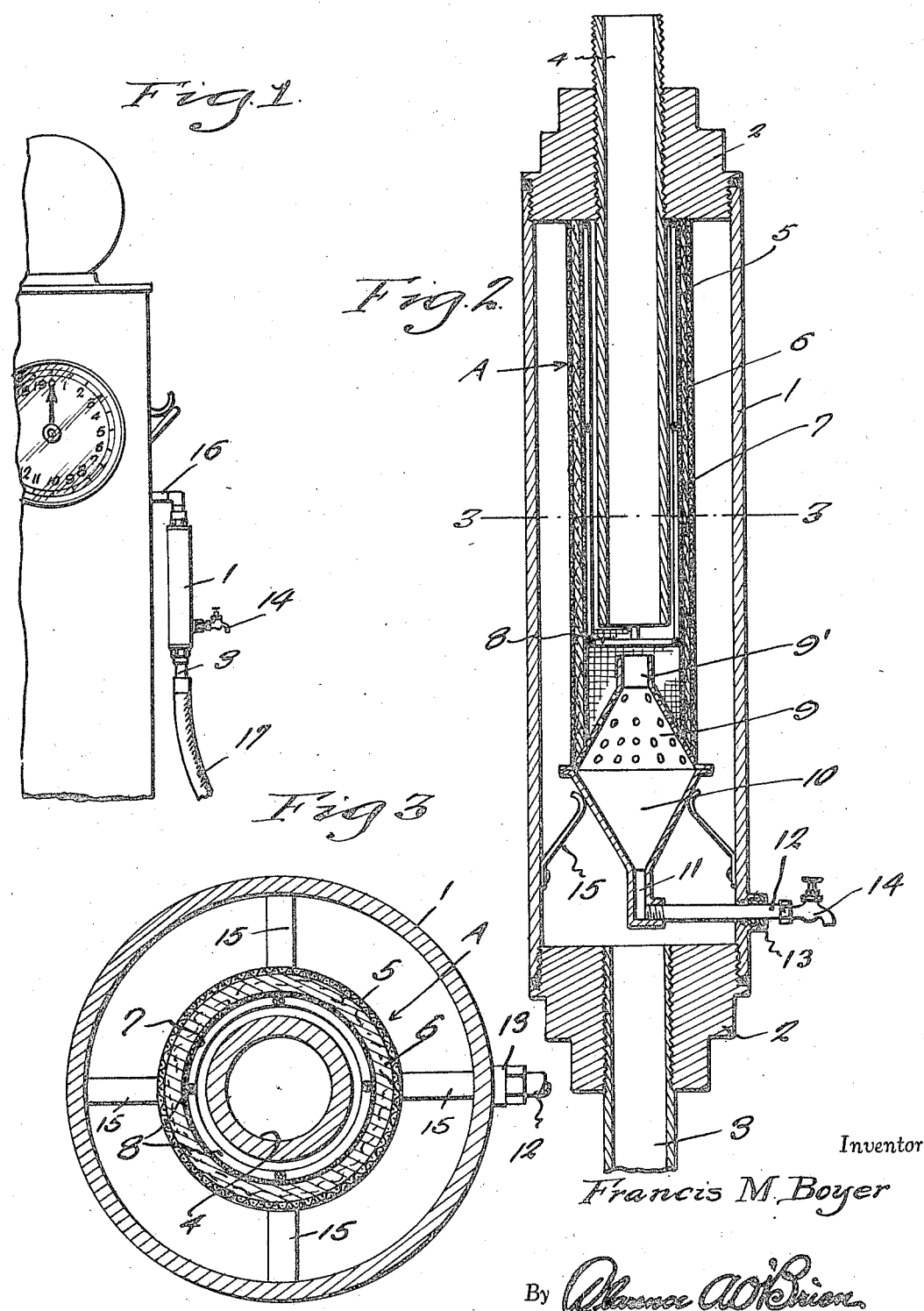
Inventor
Francis M. Boyer
By          Attorney Patented Oct. 8, 1935

2,016,740

UNITED STATES PATENT OFFICE 2,016,740

FILTERING DEVICE

Francis M. Boyer, Eustis, Fla.

Application March 26, 1935, Serial No. 13,156

2 Claims. (Cl. 210—164)

This invention relates to a filtering device mainly designed for filtering gasoline as it flows from a pump, the general object of the invention being to provide a casing having filtering means therin forming a small casing into which the fluid to be filtered is introduced so that the fluid will flow through the filtering medium into the first mentioned casing which is provided with a discharge for the filtered fluid.

Another object of the invention is to provide a sediment chamber for the sediment, water and the like filtered from the fluid, with means for draining the chamber whenever desired.

This invention also consists in certain other features of construction and in the combination and arrangement of several parts, to be hereinafter fully described, illustrated in the accompanying drawing and specifically pointed out in the appended claims.

In describing the invention in detail, reference will be had to the accompanying drawing wherein like characters of reference denote like or corresponding parts throughout the several views, and in which:—

Figure 1 is a fragmentary elevation of a gasoline pump showing the invention in use thereon.

Figure 2 is a longitudinal sectional view through the filtering device.

Figure 3 is a section on the line 3—3 of Figure 2.

In this drawing, the numeral 1 indicates a vertically arranged casing or cylinder having the upper and lower plugs 2 threaded in its end, the lower plug being provided with a centrally arranged threaded hole for receiving the discharge pipe 3 while a pipe 4 has its upper part threaded in a hole in the upper plug with the lower end of the pipe terminating at an intermediate point in the cylinder 1.

A filter cylinder A is placed in the casing or cylinder 1 and surrounds the pipe 4 and is composed preferably of an outer coarse copper screen 5, the filtering material 6, preferably of chamois and an inner fine copper screen 7. The filter cylinder is supported by a frame 8 which spaces it from the pipe 4 and the filter cylinder extends an appreciable distance below the lower end of the pipe 4. A perforated conical member 9 extends into the lower end of the filter cylinder with a part of the lower end of the filter cylinder engaging the lower part of the member 9, as shown in Figure 2 and an inverted conical member 10 is connected to the lower and wide end of the member 9, the two members forming a chamber, the upper portion of which is perforated, for receiving sediment, water and the like from the liquid introduced into the filtering chamber through the pipe 4. As it will be seen this chamber is located in spaced relation below the lower end of the pipe 4 so that any material or water or the like filtered from the gasoline will gravitate into the chamber formed by the members 9 and 10 through the perforations in the member 9 and through the small cylindrical inlet part 9' at the top of the member 9. The member 10 is provided with a discharge end 11 to which a pipe 12 is connected, the pipe passing through a gland 13 at the lower part of the casing 1 where a cock 14 is connected to the pipe. Thus by opening the cock the material and water in the chamber will be discharged. Resilient supporting legs 15 extend upwardly and inwardly from the internal side walls at the lower part of the casing 1 and engage the part 10 and act to hold the filter cylinder with its upper end bearing against the upper plug 2.

As shown in Figure 1 a connection 16 leads from the pump to the upper end of the pipe 4 so that the gasoline from the pump will enter the pipe 4 and thus flow into the filter cylinder, the gasoline passing through the filtering medium, through the casing 1 and will then pass from the casing to the pipe 3 and the delivery hose 17 connected to the pipe 3. The sediment, water, and the like will pass into the sediment chamber and this matter can be withdrawn from the sediment chamber by opening the cock 14.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A filtering device of the class described comprising a casing, plugs closing the ends of the casing, said casing being vertically arranged, an inlet pipe passing through the upper plug and extending to a point intermediate the ends of the casing, a filter cylinder surrounding the inlet pipe and located in the casing and extending downwardly beyond the inner end of the pipe, a frame for supporting the filter cylinder, a double conical member forming a sediment chamber having its upper portion perforated and open at its small end, fitting in the lower end of the filter cylinder, a valved pipe connected to the lower end of the chamber forming member and passing through the casing, supporting members in the casing engaging the lower conical part of the chamber forming member for holding the filter cylinder with its upper end bearing against the lower face of the upper plug.

2. A filtering device of the class described, comprising a casing, an inlet pipe extending into the casing, filtering means in the casing surrounding the pipe and extending beyond the inner end thereof, a double conical member forming a sediment chamber having a portion extending into the filtering means, said portion having openings therein, discharge means for the sediment chamber and a discharge pipe connected with the casing for the fluid passing through the filtering means.

FRANCIS M. BOYER.